United States Patent [19]

Ogawa et al.

[11] Patent Number: 4,500,599
[45] Date of Patent: Feb. 19, 1985

[54] MAGNETIC RECORDING MEDIUM

[75] Inventors: Hiroshi Ogawa; Chiaki Mizuno; Kouichi Masaki; Masaaki Suzuki; Yasuo Tamai, all of Kanagawa, Japan

[73] Assignee: Fuji Photo Film Co., Ltd., Kanagawa, Japan

[21] Appl. No.: 613,748

[22] Filed: May 23, 1984

Related U.S. Application Data

[63] Continuation of Ser. No. 384,121, Jun. 1, 1982, abandoned.

[30] Foreign Application Priority Data

May 29, 1981 [JP] Japan ................. 56-82160

[51] Int. Cl.³ .................. G11B 5/70; B32B 5/16
[52] U.S. Cl. .................. 428/336; 252/62.54; 252/62.56; 360/134; 360/135; 360/136; 427/128; 428/694; 428/900
[58] Field of Search ............ 428/694, 900, 695, 336; 427/128; 252/62.54, 62.56; 423/634; 360/134–136

[56] References Cited

U.S. PATENT DOCUMENTS 3,740,266  6/1973  Ahoshi et al. ................. 428/328
4,259,392  3/1981  Suzuki ........................... 428/694
4,281,043  7/1981  Deffeyes ........................ 428/694
4,364,988  12/1982 Andoh ........................... 428/694

FOREIGN PATENT DOCUMENTS 0143532  11/1981  Japan ............................. 428/694

Primary Examiner—Ellis P. Robinson
Attorney, Agent, or Firm—Sughrue, Mion, Zinn, Macpeak and Seas

[57] ABSTRACT

A magnetic recording medium comprising a nonmagnetic base having formed thereon a magnetic layer containing a fine particulate ferromagnetic material dispersed in a binder is disclosed. The ferromagnetic material is a mixture of two fine ferromagnetic powders (a) and (b) in a weight ratio of from 90/10 to 30/70. The powder (a) comprises $\gamma$-$Fe_2O_3$ particles having a coercivity (Hc) of 330 to 390 Oe and a saturation magnetization ($\sigma$s) of 68 to 80 emu/g at a maximum magnetizing force (Hm) of 5 KOe, and a specific surface area of 18 to 25 m²/g, and powder (b) comprises $\gamma$-$Fe_2O_3$ particles having a coercivity (Hc) of 400 to 450 Oe and a saturation magnetization ($\sigma$s) of 65 to 78 emu/g at a maximum magnetizing force (Hm) of 5 KOe, and a specific surface area of 22 to 30 m²/g. The tape has the ability to clearly and faithfully reproduce high fidelity sound.

3 Claims, 2 Drawing Figures

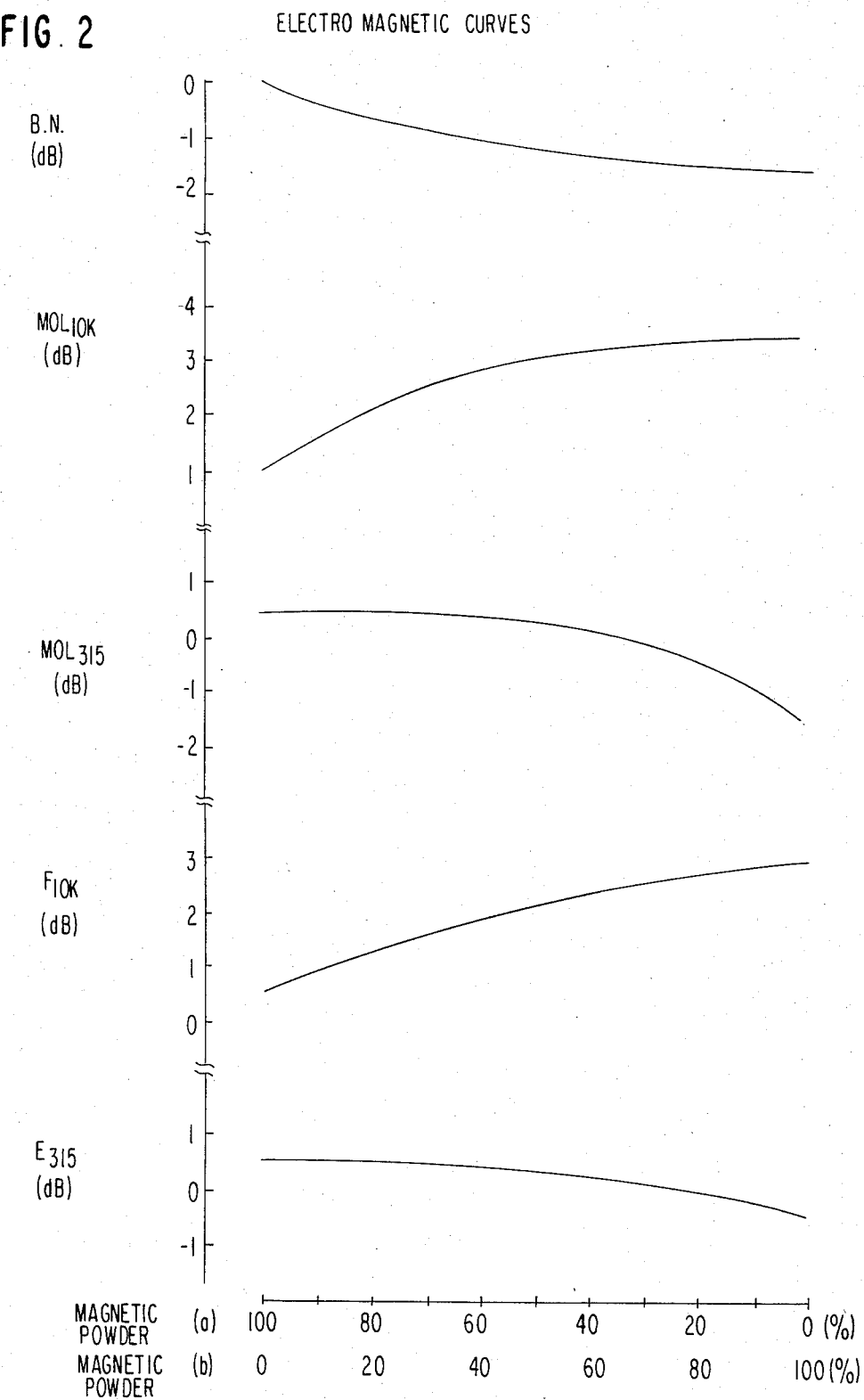

MAGNETIC RECORDING MEDIUM

This application is a continuation of application Ser. No. 384,121 filed June 1, 1982, now abandoned.

FIELD OF THE INVENTION

The present invention relates to a magnetic recording medium, and more particularly, to analog-recording type audio tapes with the ability to clearly and truely reproduce sound in high fidelity.

BACKGROUND OF THE INVENTION

The use of Phillips compact cassettes and Olympus microcassettes has expanded. Accordingly magnetic recording media, particularly, audio recording tape, has recently become very popular and has been used for recording music. Music tapes are required to have the following properties: (1) it has substantially flat frequency characteristics in an audible range of from 20 Hz to 20 KHz; (2) it has a maximum output level (MOL) high enough to reproduce undistorted high level sound; and (3) it has a noise level such as a bias noise level low enough not to overwhelm weak sound. To satisfy these requirements, various types of tapes have been developed for use in Phillips compact cassettes. Examples of such tapes include normal position tape (Type I), $CrO_2$ position tape (Type II), Fe-Cr position tape (Type III) and metal position tape (Type IV). However, with the exception of normal position tape, these tapes are expensive and must be used with a bias equalizer that differs from what is used with the normal position tape. Therefore, in order to develop a normal position tape having better hi-fi characteristics, studies on various binders and fine ferromagnetic particles have been made. However, it is fairly difficult to produce a normal position tape that meets the above mentioned requirements and which has good hi-fi characteristics.

SUMMARY OF THE INVENTION

Therefore, one object of the present invention is to provide a new magnetic recording medium.

Another object of the present invention is to provide a magnetic recording medium having flat frequency characteristics.

Still another object of the present invention is to provide a magnetic recording medium having a high maximum output level (MOL).

A further object of the present invention is to provide a magnetic recording medium having a low bias noise level.

Yet a further object of the present invention is to provide a high-fidelity magnetic recording medium.

As a result of various studies of fine ferromagnetic particles capable of providing the desired magnetic tape, the present inventors have found that a high-fidelity magnetic tape that has flat characteristics in an audible range of from 20 Hz to 20 KHz, a high maximum output level (MOL) and which still has a low bias noise level can be made by using a ferromagnetic material made of two fine ferromagnetic powders (a) and (b) in a weight ratio of 90/10 to 30/70. The fine ferromagnetic powder (a) has a coercivity (Hc) of 330 to 390 Oe and a saturation magnetization ($\sigma s$) of 68 to 80 emu/g at a maximum magnetizing force (Hm) of 5 KOe, and a specific surface area of 18 to 25 m$^2$/g. The fine ferromagnetic powder (b) has a coercivity (Hc) of 400 to 450 Oe and a saturation magnetization ($\sigma s$) of 65 to 78 emu/g at a maximum magnetization force (Hm) of 5 KOe, and a specific surface area of 22 to 30 m$^2$/g.

Therefore, the present invention provides a magnetic recording medium comprising a non-magnetic base having formed thereon a magnetic layer containing a fine particulate ferromagnetic material dispersed in a binder, said ferromagnetic material being a mixture of two fine ferromagnetic powders (a) and (b) in a weight ratio of from 90/10 to 30/70, powder (a) having a coercivity (Hc) of 330 to 390 Oe and a saturation magnetization ($\sigma s$) of 68 to 80 emu/g at a maximum magnetizing force (Hm) of 5 KOe, and a specific surface area of 18 to 25 m$^2$/g, and powder (b) having a coercivity (Hc) of 400 to 450 Oe and a saturation magnetization ($\sigma s$) of 65 to 78 emu/g at a maximum magnetizing force (Hm) of 5 KOe, and a specific surface area of 22 to 30 m$^2$/g.

BRIEF DESCRIPTION OF THE DRAWINGS

FIG. 2 shows electromagnetic property curves of a mixture of the ferromagnetic powders (a) and (b) in relation to their weight ratio.

DETAILED DESCRIPTION OF THE INVENTION

Figure 1:
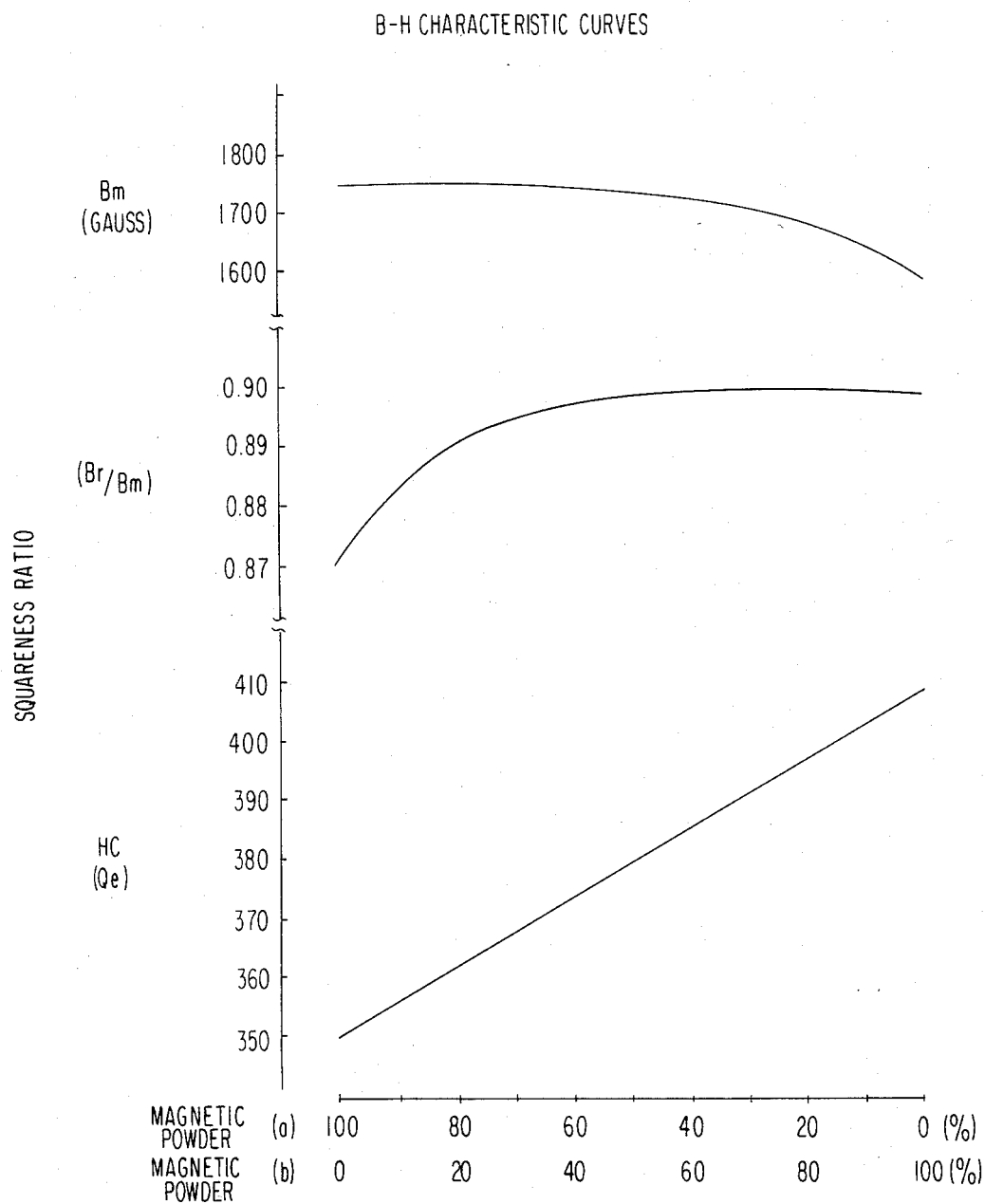
FIG. 1 shows B-H characteristic curves of a mixture of the ferromagnetic powders (a) and (b) in relation to their weight ratio.

The fine ferromagnetic powders (a) and (b) are made of acicular $\gamma$-$Fe_2O_3$ particles. The particulars meet the above listed requirements and have a length of 0.6 to 0.05 $\mu$m, preferably 0.5 to 0.1 $\mu$m and a length to width ratio (acicular ratio) of 3/1 or more, preferably 5/1 or more, and more preferably 8/1 or more. If the length of the $\gamma$-$Fe_2O_3$ particles of (a) and (b) exceeds 0.6 $\mu$m a tape having a magnetic layer made of these particles caused increased head wear and noise. If the length of the $\gamma$-$Fe_2O_3$ particles is less than 0.05 $\mu$m, the resulting tape is subjected to increased print-through. The $\gamma$-$Fe_2O_3$ powders (a) and (b) may optionally be used together with a known magnetic material such as $Fe_3O_4$, Co-containing iron oxide, Co-coated iron oxide, (Co,-Fe)-coated iron oxide, $CrO_2$ or metallic magnetic powder.

The $\gamma$-$Fe_2O_3$ particles of (a) and (b) unavoidably contain incidental impurities that originate from the manufacturing process. Desirably, these impurities contain the smallest possible amount of corrosive anions. In particular, the total amount of $SO_4^-$ and $Cl^-$ is desirably not more than 0.35 wt %, preferably not more than 0.2 wt %, of the magnetic powder. If the amount of these anions exceeds 0.35 wt %, the resulting tape corrodes the permalloy or other metallic magnetic head when run in a hot, humid atmosphere.

If the $\gamma$-$Fe_2O_3$ powder (a) having a coercivity (Hc) of 330 to 390 Oe has a saturation magnetization ($\sigma s$) or less than 68 emu/g, the resulting tape has low maximum magnetic flux density (Bm) as well as low output for low-pitch sound and low maximum output level. A $\gamma$-$Fe_2O_3$ powder having a saturation magnetization ($\sigma s$) greater than 80 emu/g is difficult to obtain utilizing present technology. If the magnetic powder (a) has a specific surface area smaller than 18 m$^2$/g, the bias noise level is increased. If the specific surface area exceeds 25 m$^2$g, the desired orientation of the magnetic particles is not achieved.

If the $\gamma$-$Fe_2O_3$ powder (b) having a coercivity (Hc) of 400 to 450 Oe has a saturation magnetization ($\sigma s$) of less than 65 emu/g, the resulting tape has low maximum magnetic flux density (Bm). A $\gamma$-Fe$_2$O$_3$ powder having a saturation magnetization ($\sigma$s) greater than 78 emu/g is difficult to obtain utilizing present technology. Magnetite and other magnetic materials of the formula FeOx ($1.34 < X \leq 1.50$) having great saturation magnetization ($\sigma$s) may be used, but they have greater chance of print-through. If the magnetic powder (b) has a specific surface area smaller than 22 m$^2$/g, the bias noise level is increased. If the specific surface area exceeds 30 m$^2$/g, the desired orientation of the magnetic particles is not obtained.

The $\gamma$-Fe$_2$O$_3$ powders (a) and (b) are used in admixture in a weight ratio of from about 90/10 to 30/70, preferably from about 80/20 to 50/50. If the weight ratio of (a) to (b) is from 100/0 to about 90/10, the desired hi-fi characteristics are not obtained since the output at 10 KHz and maximum output level (MOL) are decreased. Furthermore, the desired electromagnetic properties or audio-frequency characteristics are not obtained in the high-frequency range. If the weight ratio of (a) to (b) is from about 30/70 to 0/100, the desired hi-fi characteristics are also not obtained since the output at 315 Hz and maximum output level (MOL) are decreased. Furthermore, the electromagnetic properties characteristics and audio-frequency characteristics are poor in the low-frequency range and are disproportionately exaggerated in the high-frequency range. The desired hi-fi characteristics both in terms of electromagnetic properties and as judged by the auditory sense are obtained when the weight ratio of the fine ferromagnetic powders (a) to (b) is from about 90/10 to 30/70, and particularly good results are obtained if the ratio is from about 80/20 to 50/50.

The ferromagnetic powders (a) and (b) are dispersed in a binder which may be made of any known resin that is soluble in organic solvents, or any known resin of the aqueous emulsion type. Illustrative resins include a cellulose derivative such as nitrocellulose, cellulose acetate or cellulose acetate butyrate; a vinyl chloride acetate resin such as vinyl chloride/vinyl acetate copolymer, vinyl chloride/vinyl acetate/vinyl alcohol copolymer or vinyl chloride/vinyl acetate/maleic anhydride copolymer; a vinylidene chloride resin such as vinylidene chloride/vinyl chloride copolymer or vinylidene chloride/acrylonitrile copolymer; a polyester resin such as alkyd resin or linear polyester; an acrylic resin such as acrylic acid/acrylonitrile copolymer or methyl acrylate/acrylonitrile copolymer; and other resins such as polyvinyl acetal, polyvinyl butyral, phenoxy resin, epoxy resin, butadiene/acrylonitrile copolymer and polyurethane resin, urethane epoxy resin. These resins may be used either alone or in combination. A polyisocyanate compound may be used with these resins to harden the magnetic layer. Suitable polyisocyanate compounds include reaction products of one mol of trimethylolpropane and 3 mols of diisocyanates such as tolylene diisocyanate, xylylene diisocyanate and hexamethylene diisocyanate, an adduct of biuret with 3 mols of hexamethylene diisocyanate, an adduct of isocyanurate with 5 mols of tolylene diisocyanate, an adduct of isocyanurate with 3 mols of tolylene diisocyanate and 2 moles of hexamethyl diisocyanate, and polymers of diphenylmethane diisocyante. The above mentioned binders are used in an amount of from 10 to 50 parts by weight, preferably from 15 to 35 parts by weight, per 100 parts by weight of the ferromagnetic material.

The ferromagnetic material comprising the $\gamma$-Fe$_2$O$_3$ powders (a) and (b), as well as suitable additives are dispersed in these binders together with an organic solvent to form a magnetic paint composition which is applied onto a non-magnetic base and dried to prepare the magnetic recording medium of the present invention. For detailed information on the ferromagnetic material, additives, organic solvent, as well as the method of dispersing the magnetic material and applying the magnetic paint onto a base, see U.S. Pat. Nos. 4,135,016 and 4,320,159 which are herein incorporated by reference and Japanese Patent Application (OPI) No. 46011/79 (the term "OPI" as used herein refers to a "published unexamined Japenes patent application").

According to the present invention a magnetic layer containing the two fine ferromagnetic powders (a) and (b) dispersed in a binder preferably has a coercivity (Hc) of 350 to 390 Oe, a maximum magnetic flux density (Bm) of at least 1,700 Gauss and a squareness ratio of at least 0.87 at a maximum magnetizing force (Hm) of 1 KOe. The thickness of the magnetic layer is preferably from 2.5 to 8 $\mu$m.

The present invention is now described in greater detail by reference to the following example which is given here for illustrative purpose only and is by no means intended to limit its scope. In the example, all parts are by weight.

EXAMPLE 1

A composition having the formulation indicated below was blended in a ball mill for 24 hours and passed through a filter having an average pore size of 3$\mu$ to prepare a magnetic paint composition.

| | |
|---|---|
| $\gamma$-Fe$_2$O$_3$ particles | 100 parts |
| (a): Hc = 370 Oe, $\sigma$s = 73 emu/g, specific surface area = 23 m$^2$/g, particle length = 0.43 $\mu$m, acicular ratio = 13/1 | |
| (b): Hc = 420 Oe, $\sigma$s = 69 emu/g, specific surface area = 25 m$^2$/g, particle length = 0.40 $\mu$m, acicular ratio = 15/1 | |

| | |
|---|---|
| (The proportion of (a) to (b) is indicated in FIGS. 1 and 2.) | |
| Vinyl chloride/vinyl acetate/vinyl alcohol copolymer (molar ratio = 92/3/5, degree of polymerization = 420) | 14 parts |
| Polyester polyurethane (m.w. = ca. 130,000 | 6 parts |
| Oleic acid | 2 parts |
| Dimethyl polysiloxane (degree of polymerization = ca. 60) | 0.5 part |
| Methyl ethyl ketone | 200 parts |
| Cyclohexanone | 150 parts |

The magnetic paint was applied onto a polyethylene terephthalate film (12$\mu$ thick) with a reverse roll coater to give a dry thickness of 5.5$\mu$. While the applied coating was still wet, the web was placed under an electric magnetic (1,000 gauss) to orient the magnetic particles, and dried. The dried web was super-calendered to form a smooth magnetic layer. The web was slit into a sample audio cassette tape 3.81 mm wide (Phillips compact cassette). The characteristics of the sample cassette are shown in FIGS. 1 and 2.

The B-H characteristic curves given in FIG. 1 were obtained by measurement with a magnetometer for vibrating sample, VSM-3 (product of Toei Kogyo K.K.) at Hm of 1 KOe in the direction of magnetic orientation. Hc: coercitivity (oersteds)

Squareness Ratio: Br/Bm (Br=residual magnetic flux density, Bm=maximum magnetic flux density) Bm: maximum magnetic flux density (gauss)

The electromagnetic property curves given in FIG. 2 were obtained by measurement with a cassette deck, Model 582 of Nakamichi Research Incorporated. FUJI CASSETTE ER C-60 sold by Fuji Photo Film Co., Ltd. was used as a reference sample. The bias current was the value measured when the output of ER C-60 at 6.3 KHz was reached at the maximum level and then decreased by 4.0 dB. The output at 160 nWb/m was regarded as zero dB. The respective values of measurement are plotted in FIG. 2 as if those with ER C-60 were zero dB. The difference between the outputs of ER C-60 at 10 KHz and 315 Hz for an input of at −20 dB was −2.5 dB.

E 315: the output for an input at −20 dB of a 315 Hz sine wave

F10K: the factor commonly referred to as "5-characteristics", meaning the difference in output for an input at −20 dB of 10 KHz and 315 Hz sine waves MOL 315: the output level achieved when the proportion of the tertiary harmonic in the recorded 315 Hz sine wave becomes 3% during playback MOL 10K: the saturated output level achieved by reproducing a 10 KHz sine wave B.N.: a bias noise level as corrected by auditory sense.

As seen from FIG. 1, the coercivity of the cassette tape according to the present invention is increased in proportion to the increasing amount of ferromagnetic powder (b) mixed with (a). However, the squareness ratio and Bm remain at the fairly high level. FIG. 1 shows that a ferromagnetic mixture containing 20 to 40 wt % of (b) having good orientation is almost equal in orientation to that of (b). The probable reason for this phenomenon is that the low orientation of (a) is more than compensated by the high orientation of (b). The maximum magnetic flux density of the mixture is higher than that of the average for (a) and (b). This is perhaps because the mixing of two magnetic powders having different specific surface areas (i.e., different particle sizes) provided a magnetic material having increased density of ferromagnetic particles.

As shown in FIG. 2, all of the electromagnetic properties of the cassette tape according to the present invention change on the higher level side rather than increasing in proportion to the increasing ratio of (b) to (a). It is therefore concluded that the good electromagnetic properties of the respective powders (a) and (b) are combined when they are mixed in one magnetic composition.

The high-fidelity characteristics of music-recorded cassette tapes using various proportions of (a) to (b) according to the present invention were evaluated with an audio set composed of a record player (Model L07D of Torio Electronics, Inc.), a cassette deck (Model 680 of Nakamichi Research Incorporated), a cartridge (Model DL-305 of Nippon Columbia Kabushikikaisha), a head amplifier (Model C-7 of Acuphase K.K.), a preamplifier (Model C-Z 1 of Pioneer Electronic Corporation), a main amplifier (Model Exclusive M-4a of Pioneer Electronic Corporation), and a speaker (Model 4343 B of JBL).

When the ratio of (a) to (b) was in the range of from 100/0 to 90/10, the low-pitch sound was satisfactorily audible except that it was slightly "lax", whereas the high-pitch sound was inadequate, and the general impression was "soft but not completely faithful". When the ratio of (a) to (b) was in the range of from 30/70 to 0/100, the high-pitch sound was highly resonant, but the low-pitch sound was inadequate, and the general impression was "harsh and not full". When the ratio was in the range of from 90/10 to 30/70, the low pitch sound was well balanced with the high-pitch sound. At a ratio in the range of from 80/20 to 50/50, the balance of two sounds was most preferred to the auditory sense and the reproduced sound was as faithful to the original as possible.

Similar results were obtained when the cassette tape of the present invention was threaded in a microcassette tape which was loaded in a microcassette deck Model RD-XM 1 of Sanyo Electric Co., Ltd.

The above data shows that the cassette tape having a magnetic coating made of a mixture of two ferromagnetic powders having different values of coercivity, saturation magnetization and specific surface area has much better maximum magnetic flux density and squareness ration, and thus the cassette tape has much better hi-fi characteristics than when the individual powders are used alone.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic base having formed thereon a single magnetic layer containing a fine particulate ferromagnetic material dispersed in a binder, said ferromagnetic material being a mixture of two fine ferromagnetic material being a mixture of two fine ferromagnetic powders (a) and (b) in a weight ratio of from 90/10 to 30/70, powder (a) consisting essentially of $\gamma$-$Fe_2O_3$ particles having a coercivity (Hc) of 330 to 390 Oe and a saturation magnetization ($\sigma$s) of 68 to 80 emu/g at a maximum magnetizing force (Hm) of 5 KOe, and a specific surface area of 18 to 25 $m^2$/g, and powder (b) consisting essentially of $\gamma$-$Fe_2O_3$ particles having a coercivity (Hc) of 400 to 450 Oe and a saturation magnetization ($\sigma$s) of 65 to 78 emu/g at a maximum magnetizing force (Hm) of 5 KOe, and a specific surface area of 22 to 30 $m^2$/g, wherein the magnetic layer is from 2.5 to 8 $\mu$m thick.

2. A magnetic recording medium according to claim 1, wherein the magnetic layer has a coercivity (Hc) of 350 to 390 Oe, a maximum magnetic flux density (Bm) of 1,700 gauss or more and a squareness ratio of 0.87 or more at a maximum magnetizing force (Hm) of 1 KOe.

3. A magnetic recording medium according to claim 1, wherein the binder is contained in the magnetic layer in an amount of 10 to 50 wt % of the ferromagnetic material.

* * * * *